United States Patent [19]
Waggerman

[11] Patent Number: 5,317,945
[45] Date of Patent: Jun. 7, 1994

[54] CIRCULAR SAW BLADE FOR CUTTING ARCUATE KERFS

[76] Inventor: Larry T. Waggerman, 379 Fairway St., Hayward, Calif. 94544

[21] Appl. No.: 890,014

[22] Filed: May 27, 1992

[51] Int. Cl.⁵ .............................................. B27B 33/08
[52] U.S. Cl. ......................................... 83/835; 83/666
[58] Field of Search .......................... 83/835, 838, 666; 144/24, 238, 239, 223, 218

[56] References Cited

U.S. PATENT DOCUMENTS

| | | | |
|---|---|---|---|
| 185,363 | 12/1876 | Taylor | 83/838 |
| 197,688 | 11/1877 | Tilton | 83/855 |
| 207,450 | 8/1878 | Simonds et al. | 83/835 |
| 320,681 | 6/1885 | Perkins | 83/835 |
| 717,719 | 1/1903 | Schmidt, Jr. | 144/239 |
| 4,407,178 | 10/1983 | Storzer | 83/835 |
| 4,454,901 | 6/1984 | Thorsness | 144/218 |
| 4,602,434 | 7/1986 | Stradling | 83/835 |
| 4,850,407 | 7/1989 | Inkster et al. | 83/835 |

FOREIGN PATENT DOCUMENTS

| | | | |
|---|---|---|---|
| 1419887 | 8/1988 | U.S.S.R. | 83/835 |

*Primary Examiner*—Hien H. Phan
*Attorney, Agent, or Firm*—Thomas M. Freiburger

[57] ABSTRACT

A saw blade of the circular type for use in an electric powered saw for cutting arcuate kerfs in lumber includes a central mounting aperture coincident with a first plane perpendicular to a rotational axis, and a blade mounting portion surrounding the mounting aperture and having an annular configuration arcuate in its cross-section from its inner periphery at the aperture to its outer peripheral margin where it joins with an intermediate annular blade portion that extends generally to a second plane generally at the outer peripheral margin of the central blade mounting portion. Joined with the outer peripheral margin of the intermediate blade portion is a toothed outer peripheral portion extending angularly in a truncated cone or dished configuration generally to a third plane on the opposite side of the first plane from the second plane. Appropriately set teeth are formed on the outer periphery of the toothed outer peripheral portion and extend generally to the third plane.

9 Claims, 1 Drawing Sheet

CIRCULAR SAW BLADE FOR CUTTING ARCUATE KERFS

BACKGROUND OF THE INVENTION

1. Field of the Invention

This invention relates to circular saw blades of the type used on electric hand saws; and particularly to such a circular saw blade that will cut an arcuate kerf in lumber.

2. Description of the Prior Art

U.S. Pat. No. 197,688 issued Nov. 27, 1877, discloses a circular saw blade in which openings are provided in the body of the blade so that, in effect, the outer periphery is connected to the "eye" of the saw blade by radially extending arms. In one aspect, the radially extending arms give the entire saw blade a concave configuration. In a second aspect, the arms are detachable from the rim so that a new rim may be attached to the arm structure when the saw blade wears out. Nothing in this patent appears to suggest the capability of cutting an arcuate kerf.

U.S. Pat. No. 207,450 issued Aug. 27, 1878 discloses a circular saw blade in which the saw blade as a whole, is formed into a shallow cone, with the radius of the blade from the center of rotation to the outer periphery being a straight line. Again, nothing in this patent appears to suggest the capability of cutting arcuate kerfs.

U.S. Pat. No. 320,681 issued Jun. 23, 1885 discloses a circular saw blade one side of which is flat and the opposite side of which is generally conical from near the outer periphery to the central "eye". There is no suggestion in this patent relating to cutting an arcuate kerf.

U.S. Pat. No. 4,454,901 relates to a multi-directional planar saw blade having a generally equilateral triangular shape. Toothed truncated end portions are provided on the blade to effect cutting.

It will be seen from the prior art patents noted above that none of the structures heretofore disclosed is structurally similar to my saw blade structure. It appears that only recently has any thought been given to the concept of providing a saw blade for a so-called circular saw that cuts in anything but a rectilinear path. The most recent patent discovered is U.S. Pat. No. 4,454,901, and it is quite obvious from an examination of this patent that structurally there is no comparison between the structure of this patent and that forming the subject matter of my invention.

Typically, both in the do-it-yourself market and in the construction industry, the usual methods for cutting an arc in lumber is to use a so called "jig" or scroll saw, which is capable of producing sharp turns, almost right angles, or a band saw which is capable of cutting a curve having a larger radius, and even a relatively small radius, or a saber saw which utilizes a reciprocating blade to follow a path to be cut in lumber. For large sheets of lumber, the scroll saw and band saw are inconvenient because both of these are saws with a fixed and stationary bed, requiring that the lumber be supported on the bed and manipulated to have the saw blade follow a path to be cut. This can be very difficult when the piece of lumber that is being cut is a 4'×8' panel. The saber saw does not have this disadvantage, since it is a hand-held saw in which the saw itself is manipulated and the piece of lumber being cut is held stationary. The disadvantage of a saber saw, as compared with a circular saw, is that it is relatively slow in effecting its cut, and requires extreme care and control during use to effect a smooth cut that accurately follows a prescribed path.

Accordingly, in view of the disadvantages of the conventional methods for cutting curves in lumber, one of the important objects of the present invention is the provision of a circular saw blade that is configured in a manner that it will smoothly follow a prescribed curve or arcuate path.

Another object of the invention is the provision of a circular saw blade for cutting arcs or curves in lumber which may be mounted on the arbor of a conventional electrically driven circular hand-saw of the types that are well known in the industry.

Still another object of the invention is the provision of a circular hand-saw blade that may be configured from a conventional planar circular saw blade to cut curves having different radiuses, thus enabling use of the many different types of saw blade teeth conventionally used on circular saw blades.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In broad terms, the circular saw blade of the invention is fabricated from a tempered steel circular planar blank provided with a central mounting aperture symmetrical about the rotational axis of the blank, and having an outer periphery concentrically disposed about the central rotational axis and the central mounting aperture. The blank so formed is provided with teeth about its outer periphery and modified from its planar configuration to provide an annular blade mounting portion concentrically disposed about the mounting aperture, the inner periphery of the mounting portion defining the outer periphery of the mounting aperture, which is coincident with a first plane, while the outer peripheral margin of the mounting portion lies in a second plane parallel to the plane of the aperture, but displaced axially from the plane coincident with the mounting aperture. The outer peripheral margin of the mounting portion is integrally joined to an intermediate annular blade portion lying in the plane of the outer peripheral margin of the mounting portion, and extends radially outwardly to join at its outer peripheral margin, the inner peripheral margin of the outer annular toothed peripheral portion the outer periphery of which is provided with teeth lying coincident with a third plane parallel on the opposite side of the first plane from the second plane. The teeth formed on the outer periphery of the outer annular toothed peripheral portion are appropriately "set" in a range, for example, between 3/16" and ¼", to achieve different radiuses of curvature of a kerf.

The saw blade has a first face and a second face. On the first face the annular blade mounting portion forms a central convex bulge, and the intermediate annular blade portion forms an annular trough or concavity with the teeth outward of this annular concavity.

DESCRIPTION OF THE PREFERRED EMBODIMENT

Figure 1:
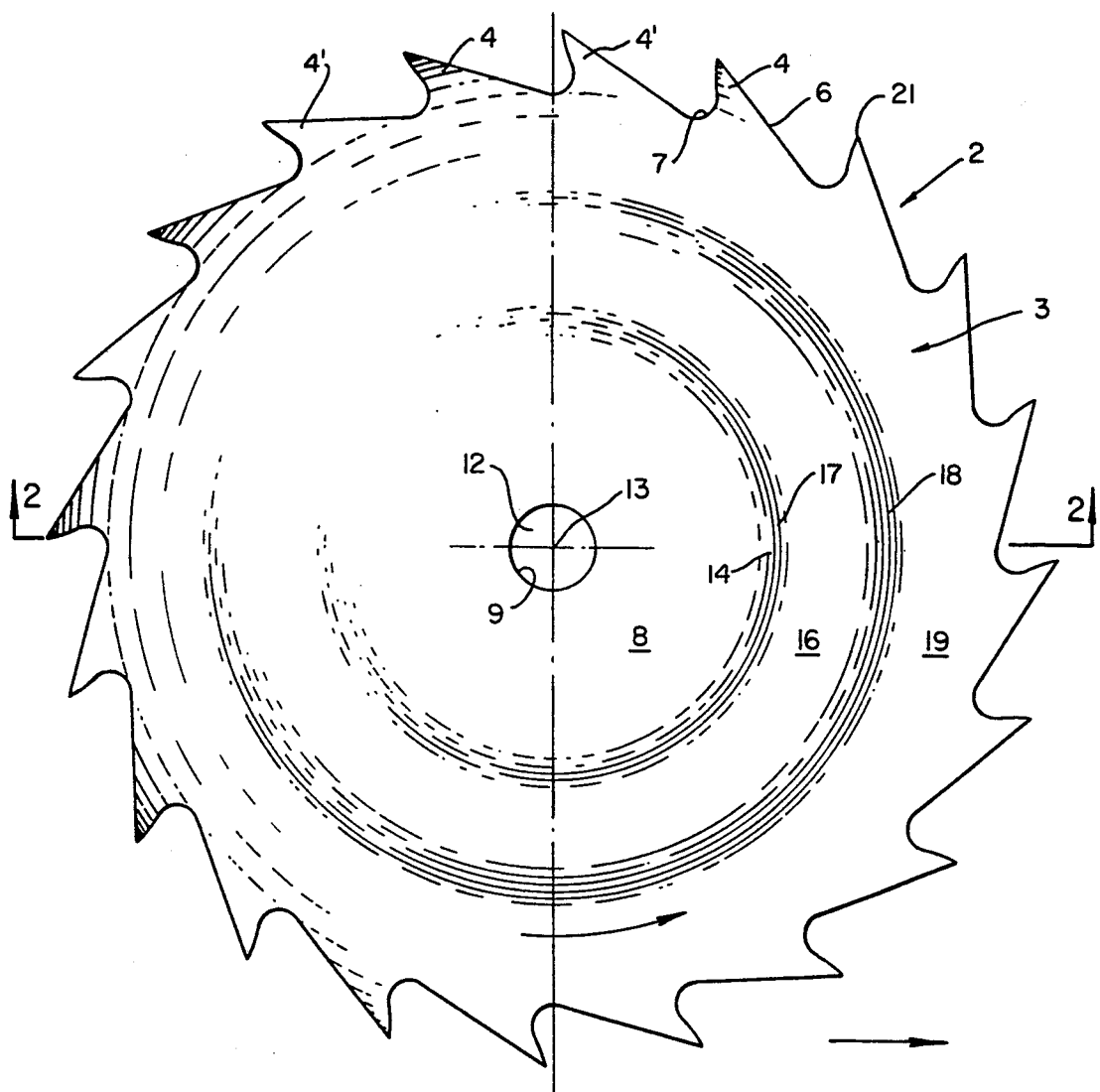
FIG. 1 is a plan view of a saw blade according to the invention adapted for cutting arcuate kerfs in lumber.

In terms of greater detail, the saw blade of my invention for cutting arcuate kerfs of varying radiuses, may constitute, for example, a saw blade having a diameter of approximately 7¼", fabricated from tempered steel, and designated generally in the drawings by the numeral 2. As there illustrated, the body 3 of the saw blade is fabricated to have a circular configuration, an outer peripheral margin of which is provided with teeth 4 and 4', each formed with a counterclockwise extending rake 6 as seen from a first face 5 and illustrated in FIG. 1, and a gullet 7 that separates one tooth from the other, there being twenty such teeth in the blade illustrated. More or less teeth may of course be used.

Figure 2:
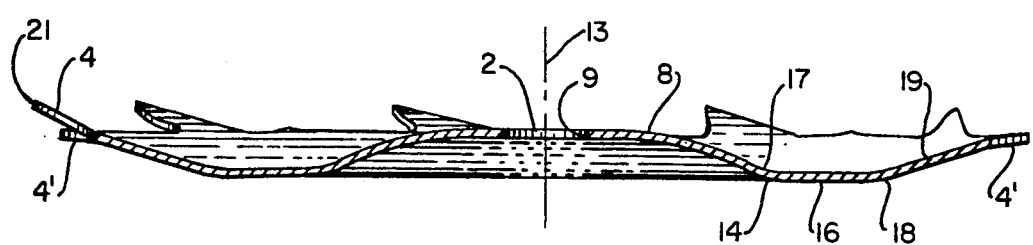
FIG. 2 is a vertical cross sectional view taken in the plane indicated by the line 2—2 in FIG. 1.

Referring to FIG. 2, showing the blade in cross section with the first face 5 upward and a second face 10 downward, it will be seen that adjacent teeth 4 and 4' are "set" in opposite directions in relation to the outer peripheral portion of the saw blade, so that the teeth alternately project on opposite sides of the generally conical outer peripheral toothed portion 19 of the blade commencing at the gullets 7, thus increasing the width of the kerf that is cut by the teeth so as to minimize the amount of friction imposed on the outer peripheral portion of the saw blade by the lumber being cut.

The saw blade 2 is provided with a central mounting portion designated generally by the numeral 8 and having an inner periphery 9 that defines the mounting aperture 12 that is centrally disposed in the saw blade 2, and symmetrical with respect to a central rotational axis 13. From its inner periphery 9, which is coincident with (i.e. extends to) a first plane P1 perpendicular to the rotational axis 13, the blade mounting portion 8 curves out of the plane of the aperture 12 forming a convex bulge 11 on the first face 5, and terminates in an outer peripheral margin 14 generally at a second plane P2 parallel to the first plane P1 in which lies the central aperture 12. The outer peripheral margin 14 of the central mounting portion 8 is integral with an intermediate annular blade portion 16 which may be planar and which is generally at the same plane P2 as the outer peripheral margin 14. The integral intermediate blade portion 16 extends radially outwardly from its inner peripheral margin 17 to an outer peripheral margin 18 which is in turn integral with the outer annular toothed portion 19 of the saw blade, the extreme outer periphery of which is provided with the teeth 4 and 4' as illustrated in FIGS. 1 and 2.

That is, the outer annular toothed portion 19 has an inner peripheral margin 18 which meets the intermediate blade portion 16 and which is the same as the outer peripheral margin of the intermediate blade portion.

It is important to note that with respect to the plane P1 in which the central aperture 12 lies, the second plane P2 defines a limit to which the intermediate blade portion 16 extends in an offset relationship from the plane P1. This second plane is spaced from and parallel with the first plane containing the central aperture 12 such that the intermediate blade portion 16 forms an annular trough or concavity 16a between the outer annular toothed portion 19 and the bulge 11 of the central mounting portion 8, as viewed from the first face 5.

As illustrated in FIG. 2, the outer peripheral toothed portion 19 of the blade extends angularly with respect to the central rotational axis, commencing at the outer peripheral margin 18 of the intermediate annular blade portion and terminating at its outer periphery 21 defined by the outer end portions of the teeth 4 and 4'. The outer annular toothed portion 19 thus defines a truncated conical portion of the blade, and the outer end portions of some of the teeth extend as shown past or beyond the first plane within which is contained the mounting aperture 12, generally to a third plane P3 that lies on the opposite side of the first plane P1 from the second plane at which generally lies the intermediate blade portion 16.

I have found that providing a circular saw blade such as that illustrated in the drawing with different parameters results in the ability to cut kerfs having different radiuses. For instance, in the blade structure illustrated, the space between the second and third planes described above amounts to approximately ⅛". The overall "set" between the outer surfaces of the offset teeth 4 and 4' in this embodiment of the invention amounts to approximately ¼". Such a blade may be used to produce a kerf having a radius from approximately 12" to 15". However, by reducing the space between the second and third planes to approximately 5/16", and by diminishing the set of the teeth to approximately 3/16" overall, the blade can be utilized to produce kerfs having radiuses ranging between about 15" to 60".

As described above, my circular saw blades for cutting arcuate kerfs may be formed or configured from conventional planar circular saw blades that a re already provided with varying kinds and number of teeth. Thus, such prefabricated planar circular saw blades may be formed by conventional metal forming techniques to provide the general configuration described above, or variations thereof regarding the position of the third plane P3 in relation to the first and second planes P1 and P2, respectively.

Having thus described the invention, what is believed to be new and novel and sought to be protected by letters patent of the United States is as follows.

I claim:

1. A saw blade for use on an power saw having an arbor on which the saw blade may be mounted for rotation about a rotational axis, the saw blade comprising:
 a) a circular mounting portion defining a central mounting aperture therein coincident with a first plane and perpendicular to the rotational axis, the circular mounting portion having an outer peripheral margin axially displaced out of said first plane;
 b) an intermediate annular blade portion extending to a second plane parallel to and axially spaced from the first plane and connected to and concentrically disposed around said outer peripheral margin of said circular mounting portion; and
 c) an outer annular toothed portion connected to and concentrically disposed around the intermediate annular blade portion, the outer annular toothed portion having an inner peripheral margin meeting said intermediate annular blade portion, the outer annular toothed portion being angularly disposed to said first and second planes so as to extend obliquely away from the second plane toward the first plane and having an outer periphery with a series of saw teeth.

2. The saw blade according to claim 1, wherein said series of saw teeth on the outer periphery of said outer annular toothed portion extend generally to a third plane parallel with said first and second planes.

3. The saw blade according to claim 2, wherein said outer annular toothed portion from its inner peripheral margin outward comprises generally a truncated portion of a right cone.

4. The saw blade according to claim 2, wherein said second and third planes are spaced apart ranging between 5/16" and ½".

5. The saw blade according to claim 1, wherein the series of saw teeth on said blade are offset from the second plane by about ¼", with a set of about ¼", to cut a kerf having a radius of about 12" to 15".

6. The saw blade according to claim 5, wherein the diameter of said saw blade is approximately 7¼".

7. The saw blade according to claim 1, wherein said circular mounting portion is generally arcuate in cross-section from said central mounting aperture to its outer peripheral margin at said second plane.

8. The saw blade according to claim 1, wherein said intermediate annular blade portion lies generally between the outer peripheral margin of said circular blade mounting portion and the inner peripheral margin of said outer annular toothed portion.

9. A saw blade for use on a portable hand-held electric circular saw having an arbor on which the saw blade may be mounted for rotation about a rotational axis, the saw blade having a first face and a second face, comprising:

a central mounting portion of the saw blade with a central mounting aperture therein for engaging onto the arbor of the portable circular saw, an intermediate annular blade portion connected to and extending from the central mounting portion.

an outer annular toothed portion connected to and concentrically disposed around the central mounting portion and the intermediate annular blade portion and having a succession of saw teeth at the extremity of the annular toothed portion, the outer annular toothed portion being obliquely angled relative to the rotational axis of the saw blade such that the succession of saw teeth extend generally outwardly in an angular relationship relative to a plane perpendicular to the rotational axis in which the mounting aperture lies, the annular toothed portion thus defining generally a truncated conical portion of the blade, and the central mounting portion of the saw blade being axially offset from the intermediate annular blade portion so as to form a convex bulge on the first face, the bulge extending in the same axial direction toward which the outer annular toothed portion angularly extends, thereby forming an annular trough in the first face at the location of the intermediate annular blade between the bulge and the annular toothed portion and thereby reducing the axial distance from the central mounting aperture to the saw teeth.

* * * * *